Figure 3:
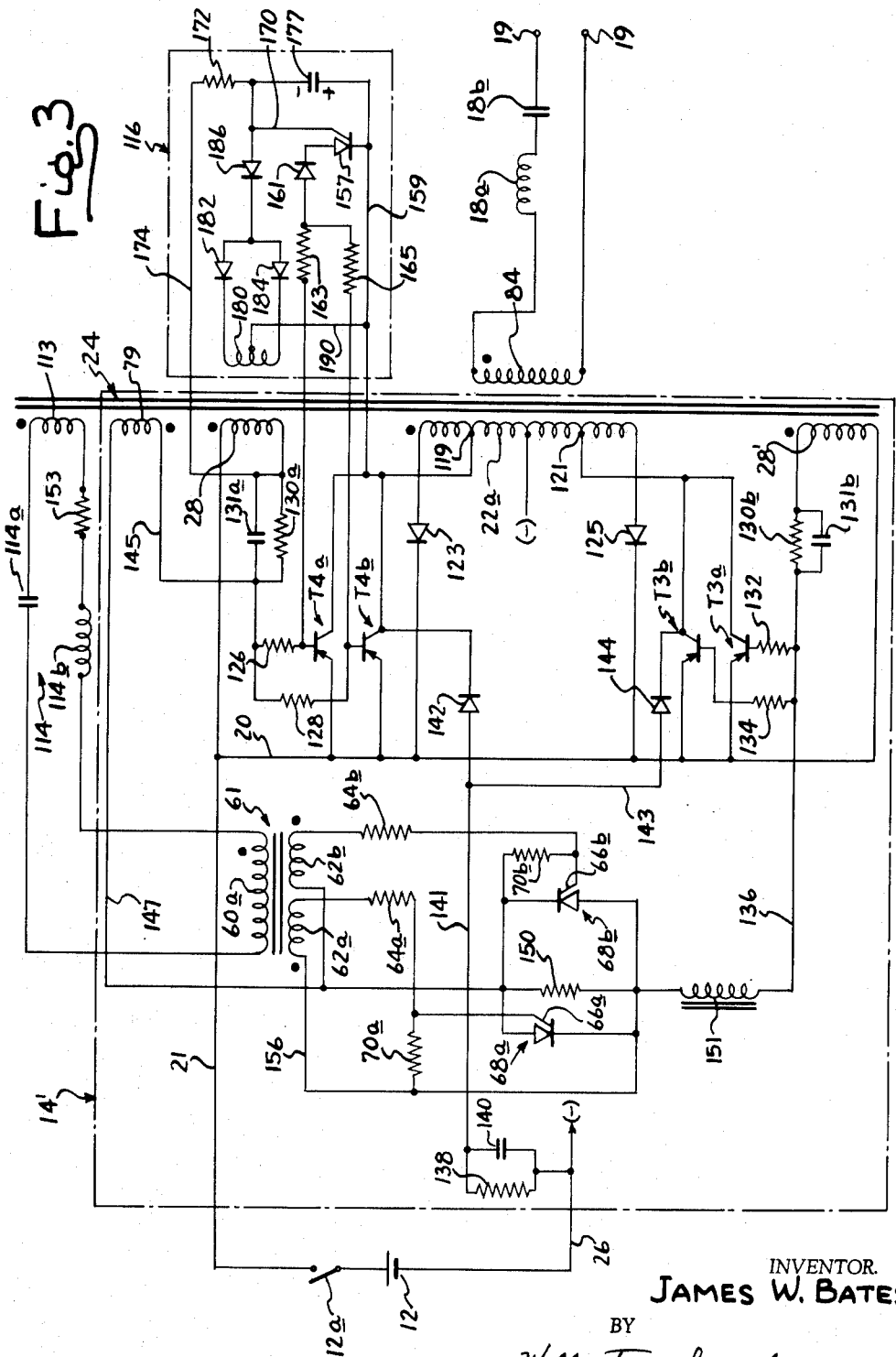

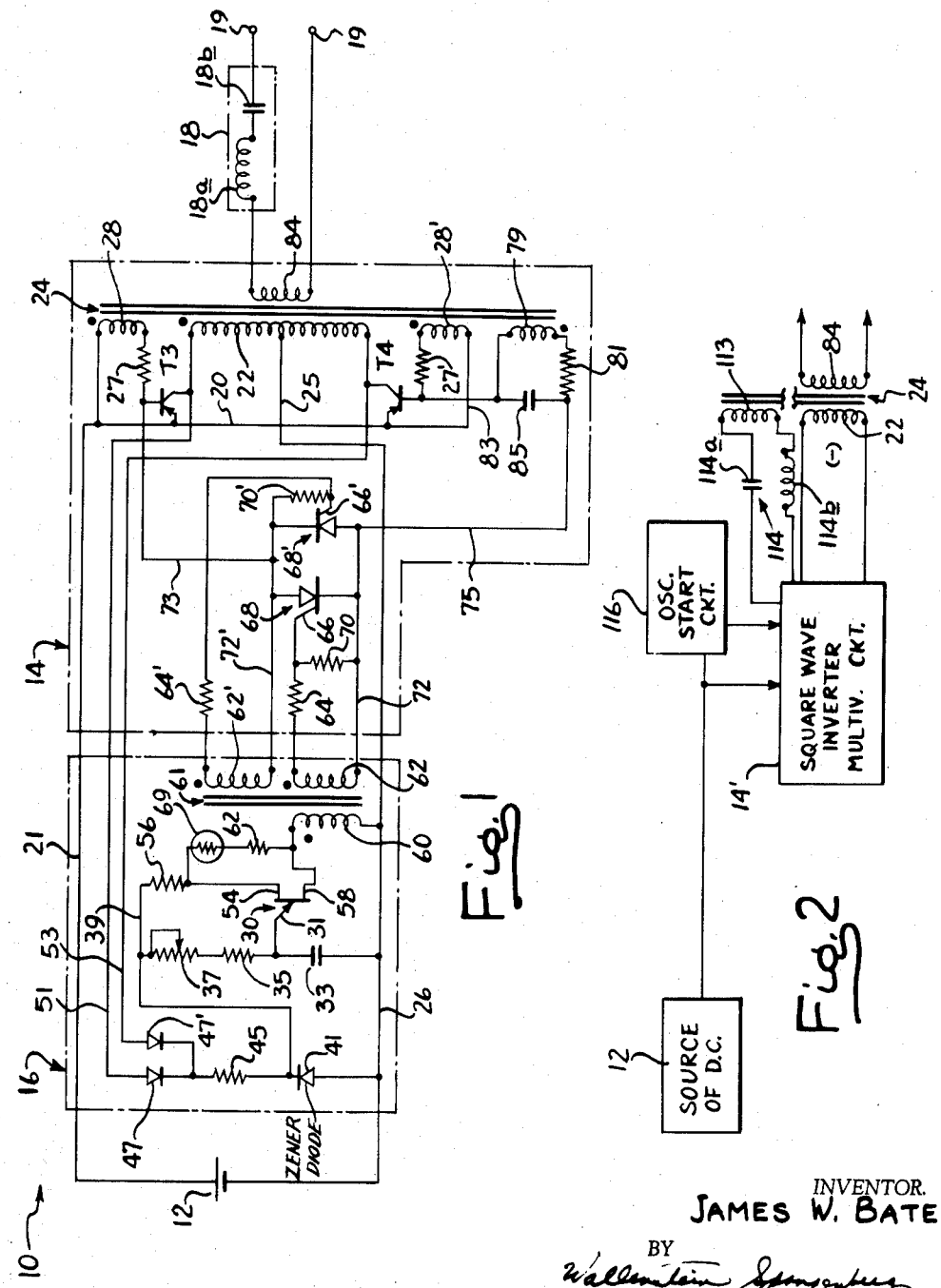

United States Patent Office 3,206,694
Patented Sept. 14, 1965

3,206,694
SYNCHRONIZED INVERTER CIRCUIT
James W. Bates, Palos Verdes, Calif., assignor to Gulton Industries, Inc., Metuchen, N.J., a corporation of New Jersey
Original application May 23, 1961, Ser. No. 111,939. Divided and this application Dec. 20, 1962, Ser. No. 246,179
12 Claims. (Cl. 331—47)

This application is a division of application Serial No. 111,939, filed May 23, 1961 on a Voltage Phase Controller.

The present invention relates to synchronized oscillator circuits, and has its most important application in oscillator circuits utilizing semiconductor and magnetic core elements which are adapted to carry appreciable amounts of power, although some aspects of the invention have a broader application. Most of the aspects of the present invention are particularly applicable in square wave oscillator circuits using semiconductor and magnetic core elements forming an inverter circuit with suitable feedback connections through windings on the core which provide a multivibrator-type circuit.

A typical square wave multivibrator inverter circuit constructed from semiconductor and magnetic core elements includes a transformer formed by a core of rectangular hysteresis material around which are wound a primary winding and a number of secondary windings including a main output winding and several feedback windings. The circuit further utilizes at least one pair of transistors whose emitter and collector electrodes are respectively connected in the same sense between the opposite ends of the primary winding of the transformer to one of the terminals of a source of direct current voltage. The other terminal of the source of direct current voltage is connected to a center tap point on the primary winding. A pair of feedback windings of the core are connected in an opposite sense to the base electrode circuits of the transistors so that the control voltages fed to the base electrodes are 180° out of phase.

When power is initially applied to the circuit described above, the transistor which starts conducting first will feed current through the associated half of the primary winding which will induce voltages in the feedback windings which will tend to maintain conduction of the latter transistor and prevent conduction of the other transistor. Upon saturation of the transformer core, the polarity of the voltages in the feedback windings will reverse, so as to cause the conducting transistor to become non-conductive and the non-conducting transistor to become conductive. The conductive states of the two transistors will continue to reverse upon saturation of the transformer core and an alternating square wave signal will appear across the output winding of the transformer.

The frequency of the multivibrator circuit just described depends upon the length of time it takes the transformer core to become saturated. This length of time will tend to vary somewhat with the circuit conditions. For many applications it becomes desirable to synchronize the frequency of the multivibrator circuit more precisely than is possible using the multivibrator circuit as a free running circuit. One aspect of the invention deals with a number of highly advantageous techniques for synchronizing a multivibrator circuit like that described at a slightly higher frequency than the free running frequency of the circuit.

Accordingly, one of the objects of the invention is to provide a highly reliable, simple and unique means for synchronizing a multivibrator circuit of the type generally described above. A related object of the invention is to provide a multivibrator circuit of the type described where the number of components required for synchronizing the circuit are held to a minimum, to maximize the efficiency and reliability of the circuit and to minimize cost, size and weight.

Another object of the invention is to provide a multivibrator circuit of the type described operating at appreciable power levels and wherein highly simple and efficient starting means are provided for enabling the start up of the multivibrator circuit.

Still another object of the present invention is to provide a multivibrator circuit of the type described which includes frequency determining synchronizing elements forming an integral part of the circuit, so that the circuit is internally rather than externally synchronized. A related object of the invention is to provide a synchronized multivibrator circuit of the type described wherein the frequency-determining elements give a substantially constant operating frequency over wide variations in temperature. A further related object of the invention is to provide a synchronized multivibrator circuit as just described which produces a square wave output and which operates in conjunction with filtering elements which filter out all but the fundamental components of the square wave output of the multivibrator circuit to form a sinusoidal output which has a minimum of distortion under varying environmental conditions which may cause variations in the frequency of the output of the multivibrator circuit.

In accordance with one aspect of the invention, the multivibrator circuit described preferably includes one or more gated diodes acting in conjunction with a third feedback winding on the multivibrator transformer core to synchronize the operation of the multivibrator circuit at a slightly higher frequency than the free running frequency thereof. Where precise synchronization of each half cycle of the multivibrator circuit output is desired, which would most frequently be the case, a pair of gated diodes are utilized with the anode and cathode electrodes thereof connected in reverse parallel relationship. One end of this parallel circuit is connected to the base electrode of one of the transistors of the multivibrator circuit and the other end of this parallel circuit is connected through the third feedback winding to the base electrode of the other transistor. The circuit connections are such that a loop circuit is formed including the anode and cathode electrodes of the gated diodes and the three feedback windings referred to above where the voltages therein will be in phase to prepare one of the two parallel connected gated diodes for firing during each half cycle of the multivibrator circuit output. When a synchronizing signal is then fed to the control electrode of the latter gated diode, it will fire, and, in so doing, will feed a voltage to the base electrode of the conducting transistor which will render it non-conductive. The multivibrator circuit is thus triggered into a reverse operating state where the conducting states of the transistors and the polarity of the voltages in the transformer windings reverses. During the next succeeding half cycle, the other gated diode will then be prepared for triggering when a synchronizing signal of proper polarity is fed to the control electrode thereof.

The synchronizing signals fed to the control electrodes of the gated diodes may be obtained from an external oscillator. Where the external oscillator produces triggering pulses of only one polarity, the frequency of the oscillator must be twice that of the desired output of the multivibrator inverter circuit so that the gated diodes can be triggered each half cycle. In the case where the external oscillator circuit is temperature sensitive, such as a relaxation oscillator circuit using a semiconductor control element, a problem arises in the stabilization of the frequency of the external oscillator where widely varying temperatures are involved.

In accordance with another aspect of the present invention, the use of an external oscillator circuit together with its disadvantages can be eliminated by incorporating directly into the multivibrator circuit a shock excitable resonant circuit which receives its energization from an additional winding on the multivibrator transformer core. The sinusoidal voltage produced in the resonant circuit is used to trigger the gated diodes referred to during successive half cycles of the multivibrator. Resonant circuit components, such as inductance and capacitor elements, are generally not very temperature sensitive and so produce a substantially stable multivibrator output frequency.

Where sinusoidal signals are derived from the square wave output of the synchronized multivibrator circuit just described by the addition of a filter circuit which substantially filters out all components of the square wave output but the fundamental sinusoidal components thereof, the utilization of a resonant circuit stabilized multivibrator circuit has a special significance and utility. This is due to the fact that a variation in the synchronizing frequency of the multivibrator circuit by even a few percent from the resonant frequency of the filter circuit results in a substantial increase in third harmonic distortion and a variation in the peak and root means square values of the filter circuit output. Filter circuits of the type normally used for the purpose most desirably comprise resonant circuit elements such as inductance and capacitor elements. However, the small changes in the synchronizing frequency of the resonant circuit stabilized multivibrator circuit due to, for example, to changes in temperature, is accompanied by a similar change in the resonant frequency of the filter circuit, and so the distortion and voltage regulation problems referred to above will be alleviated even though some small change in frequency of the multivibrator circuit output occurs.

Other objects, advantages and features of the invention will become apparent upon making reference to the specification to follow, the claims and the drawings wherein:
FIG. 1 is a detailed circuit diagram of one form of the present invention utilized to provide sinusoidal signals;
FIG. 2 is a simplified block diagram of the present invention; and FIG. 3 is a detailed circuit diagram of the preferred form of the invention of the circuit shown in block form in FIG. 2.

The circuit shown in FIG. 1 is a sine wave generator circuit 10 operating from a source of direct current voltage 12 which may be a storage battery or other direct current voltage source. The circuit includes a square wave inverter multivibrator 14 externally synchronized by a relaxation oscillator 16. The harmonic Fourier components of the square wave output of the multivibrator are filtered by a filter circuit 18 to produce a sine wave output at terminals 19—19.

The inverter multivibrator 14 shown in FIG. 1 includes a pair of PNP transistors T3 and T4 whose emitter electrodes are connected by a conductor 20 to a bus 21 leading to the positive terminal of the battery supply 12. The collector electrode of the transistor T3 is connected to the upper end of a center tapped primary winding 22 of a transformer 24 and the collector electrode of the transistor T4 is connected to the bottom end of the primary winding 22. The core of the transformer 24 is a saturable core made of a rectangular hysteresis material. The center tap of the primary winding is connected to the negative terminal of the battery supply 12 by a conductor 25 and a bus 26. It is apparent that when the transistor T3 is conducting, current flows in one direction through the primary winding 22 to the center tap point thereof, and when the other transistor T4 is conducting current flows in the opposite direction through the primary winding 22. The two transistors T3 and T4 are rendered alternately conductive by control circuits associated with the base electrodes thereof.

The base electrode of the upper transistor T3 is connected through a resistor 27 and a feedback winding 28 of transformer 24 to the positive conductor 20. The base electrode of the lower transistor T4 is connected through a resistor 27' and a feedback winding 28' of transformer 24 to the conductor 20. The feedback windings 28 and 28' are connected so that the voltage induced therein by the initial flow of current through the associated transistor will be in a direction to maintain this conduction. The polarity of the voltage induced in winding 28 or 28' when the transistor associated with the other winding is conducting will oppose conduction of the associated transistor. A multivibrator action thus results where only one transistor is conducting at a time and wherein, in the absence of synchronizing signals, the polarity of the voltages induced in the feedback windings will reverse upon saturation of the core of the transformer.

The multivibrator is synchronized by output pulses from the oscillator shown in FIG. 1. As there shown, the oscillator (16) includes a double-based diode 30. The emitter electrode 31 of the double-based diode is connected to the juncture of a capacitor 33 and a resistor 35. The resistor 35 is connected to a variable resistor 37 connected to a conductor 39. The conductor 39 extends to a voltage stabilized circuit including a Zener diode 41 whose anode electrode is connected to the negative voltage bus 26 and whose cathode electrode is connected through a resistor 45 to the cathode electrodes of a pair of diodes 47–47'. The anode of one of the diodes 47 is connected by a conductor 51 to the upper end of the primary winding 22 of the transformer 24, and the anode of the other diode 47' is connected by a conductor 53 to the bottom end of the primary winding 22. As long as the core of the transformer 24 is not saturated, a potential is developed in the primary winding 22 which is coupled through one of the diodes 47 or 47' to the Zener diode circuit to provide a fixed direct current potential for driving the oscillator circuit.

The upper base 54 of the double-based diode 30 is connected through a resistor 56 to the aforementioned conductor 39 leading to the Zener doide circuit. The bottom base 58 of the double-based diode is connected through the primary winding 60 of a transformer 61 to the negative bus 26. For temperature compensation purposes, a resistor 62 and a thermistor 69 are connected in series between the upper and lower bases of the double-based diode 30. As long as the Zener diode circuit is receiving potential from the primary winding of the transformer 24, the resultant direct current voltage developed in this circuit is effective to charge the capacitor 33. When the capacitor 33 reaches the firing potential of the double-based diode 30, the capacitor discharges through the emitter and base electrodes of the double-based diode to provide a pulse of current in the primary winding 60 of the transformer 61. The gated diode then becomes relatively non-conductive again and the capacitor repeats the cycle just described. A voltage pulse of a fixed predetermined frequency appears in secondary windings 62 and 62' of the transformer 61.

The corresponding ends of the secondary windings 62 and 62' of the transformer 61 are connected through respective resistors 64 and 64' to the control electrodes of a pair of gated diodes 68 and 68'. As will appear, the firing of the gated diode 68 or 68' will be effective to initiate the beginning of a half cycle of the square wave signal generated by the square wave multivibrator circuit 14. The control circuit of the gated diode 68 includes a resistor 70 connected between the control electrode of the latter gated diode and a conductor 72 leading to the bottom end of the secondary winding 62. The control circuit of the gated diode 68' has a corresponding resistor 70' connected between its control electrode and the conductor 72' leading to the bottom end of the secondary winding 62'.

The cathode electrode of the gated diode 68 is connected to the aforementioned conductor 72 and the cathode electrode of the gated diode 68' is connected to the corresponding conductor 72'. The anode electrode of the gated diode 68 is connected to the conductor 72' and the anode electrode of the gated diode 68' is connected to the conductor 72. The anode and cathode electrodes of the gated diodes 68 and 68' are effectively connected in reverse parallel relationship so that only one of the gated diodes is rendered conductive at any instant to close the circuit between a pair of conductors 73 and 75.

The transformer 24 has a feedback winding 79 which is coupled between the base electrode of transistors T3 and T4 when one of the gated diodes 68 or 68' is fired. To this end, one end of the feedback winding 79 is connected to the base electrode of transistor T4 and the other end is connected to the conductor 75 leading to the gated diodes. The conductor 73 extending to the gated diodes is connected to the base electrode of transistor T3.

The connections between the gated diodes and the feedback windings 28, 28' and 79 are such that a loop circuit is formed where these windings are always in phase additive relationship when they are effective to prepare one of the gated diodes for conduction and to render the other gated diode non-conductive. Also, upon initial conduction of one of the gated diodes the voltages induced in the feedback winding 79 and the respective windings 28 or 28' are in series additive relation in opposite sense with respect to the base to emitter circuits of the respective transistors T3 and T4 and are operative to render conductive the transistor which is then non-conductive and to render non-conductive the transistor which is then conductive.

The loop circuit referred to can be traced from the common conductor 20 to the dotted end of the feedback winding 28, through a resistor 27 connected to one base electrode of the upper transistor T3, the conductor 73, gated diode 68 or 68', conductor 75, a resistor 81, the dotted end of the feedback winding 79, a resistor 27', the dotted end of the feedback winding 28' and a return conductor 83 connected to the common conductor 20 leading to the positive bus 21.

A summary of the operation of the multivibrator circuit may be explained as follows. When power is initially turned on, one of the transistors T3 or T4 will start conducting first. Whichever transistor this may be, the resulting flow of current through the associated half of the primary winding 22 will induce a voltage in the feedback windings 28 and 28' which are connected, as previously explained, in opposite sense between the base and emitter electrodes of the associated transistors, so that the voltages induced therein will be in a direction to sustain the conduction of the first to conduct transistor and to render the other transistor non-conductive. As previously indicated, in the absence of the portion of the circuit including the gated diodes 68 and 68', the circuit just described would act as a free running square wave multivibrator circuit at a frequency which is preferably lower than one-half the frequency of the synchronizing oscillator 16. Normally, the pulses from the synchronizing oscillator 16 will be effective to switch the conductive states of the transistors before the associated transformer has become fully saturated. When an oscillator pulse appears in transformer secondary windings 62 and 62', the gated diode which is prepared to fire by the additive voltages in the feedback windings of the loop circuit referred to above will fire. The voltage then induced in the feedback winding 79 will add to the voltages induced in the feedback winding 28' to change the conductive state of the transistor T3 and will add to the voltage induced in the feedback winding 28, to change the conductive state of the transistor T4. When the conductive states of the transistors T3 and T4 have thus become reversed from their previous conditions, the polarity of the voltages then induced in the feedback windings 28, 28' and 79 will reverse also. Normally this would result in the blocking of the then conductive gated diode and the preparation of the other gated diode for firing by the next synchronizing oscillator pulse.

If the current synchronizing oscillator pulse has not subsided by the time the conductive states of the transistors have been switched and the gated diode rendered non-conductive, this pulse can retrigger the circuit, which would obviously be undesirable since it is the next trigger pulse and not the trigger pulse referred to that is to trigger the next half cycle of operation of the square wave generator circuit. To prevent this occurrence, a capacitor 85 is connected between the upper end of the feedback winding 79 and the end of the resistor remote from the bottom end of the feedback winding 79. The capacitor 85 sustains the conduction of the fired gated diode for awhile to insure the decay of the synchronizing oscillator pulse before the gated diode involved is rendered non-conductive.

It is possible that the initial timing conditions in the circuit are such that the core of transformer 24 will saturate before the first pulse is generated by the synchronizing oscillator 16. In such case, the saturation of the core will result in a reversal of the conduction of the transistors T3 and T4. The subsequent pulses generated by the oscillator may thereafter occur at points in the operating cycle of the multivibrator which permit the circuit to be triggered alternately by the saturation of the core and by the synchronizing pulses which will cause the square wave oscillator circuit to operate at twice the desired frequency, which, of course, is undesirable. This result is prevented by designing the oscillator 16 so that the normal operation thereof is disrupted if the transformer 24 should saturate. To this end, the energization circuit of the synchronizing oscillator 16 is designed as previously described where the energizing voltage therefor is obtained from the voltage developed in the primary winding 22 of the transformer 24. As previously explained, the energization voltage for this circuit disappears when the transformer 24 saturates, which results in the discharge of the timing capacitor 33, thereby disrupting the normal timing cycle of the synchronizing oscillator 16.

A square wave output signal appears across an output winding 84 of the transformer. When a sine wave signal is desired, the output winding 84 is coupled to the filter 18 which removes substantially all harmonic components from the square wave signal leaving the fundamental sine wave component thereof. The filter 18 may comprise an inductance 18a in series with a capacitor 18b forming a series resonant circuit tuned to the desired frequency of the multivibrator 14.

The exemplary embodiment of the invention shown in FIG. 1 is highly satisfactory, provided the frequency of the oscillator 16 does not vary much in frequency. Wide temperature fluctuations or aging of the double-based diode 30 will change the frequency of the oscillator 16 and hence the frequency of the multivibrator 14. Such a variation in frequency is undesirable from a number of standpoints. In the first place, it would obviously be undesirable in a situation where the equipment to be operated by the circuit requires a fixed frequency. In the second place, any appreciable frequency variation will adversely affect the voltage regulation of the circuit and will add distortion to the sine wave signal at the output of the filter 18 since the filter would not then be tuned to the frequency of the multivibrator because the resonant circuit elements making up the filter have no relationship to the frequency of the relaxation oscillator 16. A variation in the frequency of the oscillator 16 by even a few percent from the fundamental resonant frequency of the filter 18 may result in a substantial increase in third harmonic distortion and variation in the peak and root means square value of the filtered output. It is, therefore, highly advantageous to keep the frequency determining element of the oscillator 16 to as close a tolerance as possible, without complicating the circuit. To this end, the embodiment of the invention shown in a simplified box diagram form in FIG. 2 was developed. FIG. 3 shows the preferred circuit for the circuit arrangement illustrated in FIG. 2. The circuit of FIG. 3 has many components in common with the circuit of FIG. 1 and the components shown in FIG. 3 which correspond to components in FIG. 1 have been given similar reference numerals. The circuit of FIGS. 2 and 3 not only has a better frequency and voltage regulation with age and widely varying temperature conditions than the circuit of FIG. 1, but it is a less complicated and more efficient circuit and is capable of delivering signals capable of feeding much greater loads.

One of the improvements in the circuit of FIGS. 2 and 3 is the utilization of resonant circuit components 114 for synchronizing the multivibrator which are similar to those used in the filter 18. These resonant circuit components include a capacitor 114a and an inductance coil 114b forming a resonant circuit tuned to the desired frequency of the inverter circuit and used in a unique way never before used in an inverter type multivibrator. The use of the resonant circuit 114 has many advantages over the method of frequency control used in the embodiment of FIG. 1. In the first place, the capacitor and inductance circuit components are much less prone to vary with temperature and age than a double-based diode or similar semiconductor device. Just as important, however, is the fact that any changes in the resonant frequency of the circuit 214a which do occur take place in the same direction and to a similar degree to changes of the resonant frequency of the capacitor and inductance components making up the filter 18.

Still another improvement of the circuit shown in FIGS. 2 and 3 is that the resonant circuit components 114 form a shock-excitable circuit energized directly from the windings of the transformer 24. This makes unnecessary the use of double-based diodes or other current control devices to form an oscillator circuit which has greatly limited power capabilities such as the relaxation oscillator 16 of FIG. 1. The circuit of FIG. 1 as a practical matter requires another inverter multivibrator driven by the square wave output of the multivibrator 14 to achieve the driving power capabilities of the circuit of FIG. 3.

The multivibrator shown in FIGS. 2 and 3 is identified by reference number 14' and is an inverter circuit similar in many respects to the multivibrator 14 in FIG. 1. Thus, the multivibrator has an output transformer 24 with windings 22, 28, 28', 79 and 84. An additional secondary winding 113, however, is added to transformer 24 to which winding the capacitor 114a and inductance 114b are connected forming a shock excitable resonant circuit. The circuit 114 receives energy pulsations each time the current reverses in direction in the primary winding 22 of the transformer. The resultant shock excitation of the resonant circuit produces sinusoidal oscillations which are used to synchronize the multivibrator in a manner to be explained in connection with a detailed description of FIG. 3 to be given below.

Where the multivibrator 14' is to deliver large amounts of power and appreciable drive power is required to start the multivibrator 14, it may be necessary to add an oscillator start circuit 116 (FIG. 2) which feeds current in a given direction through the primary winding 22 of the transformer 24 to initiate feedback signals and the stock excitation of the resonant circuit 114.

Refer now to FIG. 3 in particular for a detailed description of the multivibrator 14'. As there shown, respective pairs of parallel connected power transistors T3a–T3b and T4a–T4b are used instead of the transistors T3 and T4. The emitter electrodes of all these transistors are connected to the common line 20 leading to the positive power bus 21. The collector electrodes of the transistors T4a and T4b are connected to a common tap point 119 at the upper portion of the primary winding 22 and the collector electrodes of the transistors T3a and T3b are connected to a common tap point 121 at the lower portion of the primary winding 22. The primary winding 22a has a center tap leading to the negative power bus 26.

The upper end of the primary winding 22 is connected by a reverse current bypass rectifier 123 to the positive line 20 and the bottom end of the primary winding 22 is connected through a reverse current bypass rectifier 125 to the latter line 20. The base electrodes of the transistors T4a and T4b are connected through respective resistors 126 and 128 to a common point, in turn, connected through a resistor 130a in parallel with a capacitor 131a to the bottom end of a feedback winding 28 of the transformer 24. The other end of the transformer winding 28 is connected to the positive voltage bus 21.

In a like manner, the base electrodes of the transistors T3a and T3b are connected through respective resistors 132 and 134 to a common point in turn connected through a resistor 130b in parallel with a capacitor 131b to the upper end of feedback winding 28'. The other end of the winding 28' is connected to the line 20 leading to the positive bus 21.

A circuit for filtering spike voltages from the circuit is provided which includes a resistor 138 in parallel with a capacitor 140 connected to the negative voltage bus 26. A conductor 141 connects the resistor and capacitor through a rectifier 142 arranged to block negative pulses to the collector electrodes of the transistors T4a and T4b. The line 141 is also connected by a conductor 143 and through a rectifier 144 arranged to block negative pulses to the collector electrodes of the transistors T3a and T3b.

The feedback winding 79 has a bottom end connected by a conductor 145 to the juncture between resistors 126 and 130a. The upper end of the winding 79 is connected by a conductor 147 to one end of a parallel circuit comprising the anode and cathode or load terminals of a pair of gated diodes 68a and 68b which operate in a similar manner to gated diodes 68 and 68' in the embodiment of FIG. 1. A resistor 150 is connected in parallel with the cathode and anode electrodes of the gated diodes. The bottom end of the parallel circuit is connected through a saturable choke 151 to the aforementioned conductor 136 leading to the base electrode connecting resistors 132 and 134 associated with the transistors T3a and T3b. The saturable choke is designed to saturate prior to the core of transformer 24 and is operative to prevent reverse current flow through the synchronizing circuit during the interval when the currently fired diode is becoming de-energized upon reversal of the voltage in the transformer 24. The resistor 150 permits current to flow through the choke 151 upon the aforesaid reversal of voltage so that the choke 151 will become saturated immediately after the currently fired gated diode becomes non-conductive to enable the other gated diode to be immediately prepared for firing by the next synchronizing pulse.

The various connections described connecting the feedback windings 28, 79 and 28' and the load terminals of the gated diodes 68a and 68b form a loop circuit where the voltages induced in the feedback windings are always in additive relationship. As in the previously described circuit of FIG. 1, whenever one of the gated diodes 68a and 68b is fired, the conducting states of the transistor pairs T4a–T4b and T3a–T3b are reversed to initiate a new half cycle of the multivibrator.

The circuit for triggering the gated diodes 68a and 68b includes the aforesaid resonant circuit 114 including capacitor 114a and inductance 114b forming a series resonant circuit which resonates at the desired frequency of operation of the multivibrator which is somewhat higher than the free running frequency thereof. The capacitor 114a is shown connected to the upper end of the transformer winding 113 and the inductance 114b is connected through a resistor 153 to the bottom end of the transformer winding 113. This series resonant circuit is connected between the opposite ends of a primary winding 60a of a pulse transformer 61. The transformer 61 has secondary windings 62a and 62b associated with the control electrodes 66a and 66b of the gated diodes 68a and 68b, respectively. The right hand ends of the windings 62a and 62b are shown respectively connected through resistors 64a and 64b to the control electrodes 66a and 66b, respectively. The left hand end of the winding 62b is connected to the aforementioned conductor 147 leading to the upper end of the parallel connected cathode and anode electrodes of the gated diodes. The left hand end of the winding 62a is connected by a conductor 156 to the bottom end of the parallel circuit referred to. The connections made from the transformer windings 62a and 62b to the control electrodes of the gated diodes are such that the polarity of the pulses fed thereto are of opposite polarity at any given instant, and the gated diode receiving a positive pulsation control signal at any instant is the gated diode which has applied thereto by the aforesaid feedback windings a voltage of proper polarity to fire the gated diode involved.

The shock excitable resonant circuit 114 receives its energy from the voltage induced in the winding 113. The polarity of this excitation voltage will obviously change each time the multivibrator starts a new half cycle which, in turn, is initiated by the shock excited signals in the resonant circuit 114. As the sine wave voltage induced in the primary winding 60a of the transformer 61 changes direction, a pulse having a polarity dependent upon the direction of this change will be applied to the control electrodes 66a and 66b of the gated diodes. It is apparent that the multivibrator is synchronized to operate at the frequency of the resonant circuit 114.

Due to the power requirements necessary to start the multivibrator into operation, a unique oscillator start circuit is provided for initially feeding current through the primary winding 22a of the output transformer 24 to generate induced voltages in the various feedback windings to start the oscillator or multivibrator circuit. This oscillator start circuit, generally indicated by reference numeral 116, includes as a basic control element thereof a gated diode 157. The cathode electrode of this gated diode is connected to a conductor 159 extending to the tap point 119 of the primary winding 22a of the output transformer 24. The anode electrode of the gated diode 157 is connected to the cathode electrode of a rectifier 161 acting primarily as a voltage dropping element in a manner to be described. The anode of the rectifier 161 is connected through respective resistors 163 and 165 to the base electrodes of the transistors T4a and T4b. The control electrode of the gated diode 157 is connected through a conductor 170, a resistor 172 and a conductor 174 to the bottom end of the feedback winding 28. Due to the connections just described, a circuit can be traced which, when the direct current voltage supply 12 is connected into the circuit by the closure of a power on-off switch 12a, effects firing of the gated diode 157 to start heavy conduction of the transistors T4a–T4b which feeds current in a given direction through the primary winding 22a to start the oscillation of the multivibrator. This circuit can be traced from the power bus 21 through the line 20, emitter and base electrodes of transistors T4a and T4b, resistors 163 and 165, rectifier 161, anode and cathode terminals of the gated diode 157, conductor 159, and the winding 22a connected to the negative power bus 26. The voltage applied to the gated diode 157 by this circuit is in a direction to fire the same provided, of course, the control electrode thereof receives a positive triggering voltage. The circuit for applying the positive triggering voltage can be traced from the bottom end of the transformer winding 28, and through the conductor 174, resistor 172 and conductor 170 leading to the control electrode of the gated diode. The current flow established in the gated diode flows through the emitter and base electrodes of the transistors T4a–T4b which is amplified to provide a heavy emitter-collector current which flows in the primary winding. This amplified current initiates the oscillation of the multivibrator. The voltage drop across the rectifier 161 in series with the gated diode 157 drops the voltage applied to the anode and cathode electrodes of the gated diode to enable the gated diode to be rendered non-conductive more easily in a manner to be described, to increase the efficiency of the circuit.

The circuit for rendering the gated diode 157 non-conductive once the oscillator has started oscillating includes a capacitor 177 which is gradually charged once the multivibrator oscillator begins oscillating. The capacitor 177 is connected between the control and cathode electrodes of the gated diode 157. When the voltage at the upper end of the plate of the capacitor reaches a given negative value with respect to the bottom plate thereof, the voltage conditions of the circuit are such that a positive voltage cannot be established across the control electrode of the gated diode 157. The gated diode cannot then refire after the voltage conditions applied to the anode and cathode electrodes thereof are reduced to a value which will not support the conduction thereof, which condition exists during the second half cycle of operation of the multivibrator circuit. The circuit for charging the capacitor 177 to the negative voltage referred to includes a full wave rectifier circuit energized from an additional winding 180 on the transformer 24. The opposite ends of this winding are connected through respective rectifiers 182 and 184 to a common rectifier 186, in turn, connected to the upper plate of the capacitor 177. The winding 180 has a center tap connected by a conductor 190 to the conductor 159 leading to the bottom end of the capacitor 177. It is apparent, therefore, that as soon as the multivibrator starts operating, a negative voltage will be coupled through the full wave rectifier circuit just described to the capacitor 177 to charge the same to the negative voltage referred to. When this occurs, the oscillator starter circuit will be disabled and the circuit will operate at top efficiency.

It should be understood that numerous modifications may be made of the preferred forms of the invention described above without deviating from the broader aspects of the invention.

What I claim as new and desire to protect by Letters Patent of the United States is:

1. An alternating current oscillator comprising: a saturable core transformer having a center tapped primary winding and a first, second and third feedback winding, a first and a second unidirectional current control device each having load terminals and a control terminal, a source of energizing direct current, means connecting said source of energizing direct current between the center tap of said primary winding and the corresponding load terminals of said current control devices which are operable to feed the direct current in the low impedance direction therethrough, the other load terminals of said current control devices being respectively connected to opposite ends of said primary winding, means connecting said first and second feedback windings in opposite sense respectively between the control and load terminals of said respective current control devices for providing a normally free running feedback oscillator where the control voltages induced into said feedback windings from said primary winding maintain conduction of the first to conduct current control device and prevent conduction of the other current control device until the transformer core reaches a given state of saturation or the device otherwise is rendered non-conductive where the conductive states of the devices will reverse, gated diode means having control terminal means and load terminal means, means connecting said third feedback winding and the load terminal means of said gated diode means in series between the control terminals of said current control devices, said feedback windings being connected in a loop circuit including the load terminal means of the gated diode means where the voltages induced therein are in phase and, during a portion of each cycle of oscillator operation, are effective to prepare said gated diode means for triggering when a trigger pulse is fed to the associated control terminal means, and oscil-

11 lator synchronizing means for periodically feeding trigger pulses to the control terminal means of said gated diode means to trigger the gated diode means prepared for a triggering operation, which reverse the conductive states of said current control devices resulting in a reversal in polarity of the induced voltage in said feedback windings which renders the conductive gated diode means non-conductive again the frequency of said trigger pulses is sufficiently high that said given state of saturation of the transformer core is not normally reached before the gated diode means involved is fired.

2. An alternating current oscillator comprising: a saturable core transformer having a center tapped primary winding and a first, second and third feedback winding, a first and a second unidirectional current control device each having load terminals and a control terminal, a source of energizing direct current, means connecting said source of energizing direct current between the center tap of said primary winding and the corresponding load terminals of said current control devices which are operable to feed the direct current in the low impedance direction therethrough, the other load terminals of said current control devices being respectively connected to opposite ends of said primary winding, means connecting said first and second feedback windings in opposite sense respectively between the control and load terminals of said respective current control devices for providing a normally free running feedback oscillator where the control voltages induced into said feedback windings from said primary winding maintain conduction of the first to conduct current control device and prevent conduction of the other current control device until the transformer core is saturated or the device otherwise rendeed non-conductive where the conductive states of the devices will reverse, gated diode means having control terminal means and load terminal means, means connecting said third feedback winding and the load terminal means of said gated diode means in series between the control terminal means of said current control devices, said feedback windings being connected in a loop circuit including the load terminal means of the gated diode means where the voltages induced therein are in phase and effective to prepare the gated diode means for triggering into a conductive state when a trigger pulse is fed to the associated control terminal means, means for feeding trigger pulses to the control terminal means of said gated diode means to trigger into londuction the gated diode means receiving a voltage of proper polarity from the feedback windings in said loop circuit, which reverse the conductive states of said current control devices resulting in a reversal in polarity of the induced voltage in said feedback windings which renders the conductive gated diode means non-conductive again, and means in said loop circuit for sustaining conduction of the conducting gated diode means to ensure termination of the current trigger pulse before the triggered gated diode means is rendered non-conductive by said reversal of polarity of the voltages induced in said feedback windings.

3. In combination with an alternating current oscillator circuit comprising: a source of direct current, a saturable core transformer having a center tapped primary winding and a first, second and third feedback winding, a first and second unidirectional current control device each having load terminals and a control terminal, means connecting said load terminals of said current control devices in series with the opposite ends of said transformer windings and said source of direct current between corresponding load terminals of said current control devices and the center tap of said primary winding to form an inverter circuit, and means connecting said first and second feedback windings respectively between the control and load terminals of said first and second current control devices to form a free running square wave oscillator, rectifier means, a synchronizing circuit for said oscillator comprising a relaxation oscillator circuit providing a pulse output at a higher pulse repetition rate than twice the free running frequency of said former oscillator circuit and coupled to one of the windings on said transformer through said rectifier means, the voltage in the transformer winding energizing said relaxation oscillator circuit only when the transformer core is unsaturated, gated diode means having load terminal means and control terminal means, means connecting the load terminal means of said gated diode means and said third feedback winding in series between the control terminal means of said current control devices, said feedback windings being connected in a loop circuit including the load terminal means of the gated diode means which circuit provides an energizing potential which prepares said gated diode means for triggering when a signal pulse is fed to the associated control means, and means coupling the pulse output of said relaxation oscillator circuit to said control terminal means of said gated diode means to render the same conductive to reverse the conductive conditions of said current control devices each cycle of operation thereof.

4. An alternating current oscillator comprising: a first and a second unidirectional current control device each having load terminals and a control terminal, a source of energizing direct current, means interconnecting said source of energizing direct current and the load terminals of said current control devices to feed load current therethrough when the devices are permitted to conduct, a saturable core transfomer having a primary winding and a first, second and third feedback winding, means connecting said primary winding to the load terminals of said current control devices wherein the direction of current flow through the primary winding varies with the particular current control device which is conducting, means connecting said first and second feedback windings in the opposite sense respectively to the control terminals of said respective current control devices for providing a normally free running feedback oscillator where the control voltages induced into said feedback windings maintain conduction of the first to conduct current control device and prevent conduction of the other current control device until the transformer core is saturated or the device otherwise rendered non-conductive where the conductive states of the devices will reverse, gated diode means having control terminal means and load terminal means, means connecting said third feedback winding and load terminal means of said gated diode means in series between the control terminals of said current control devices, said feedback windings being connected in a loop circuit including the load terminal means of the gated diode means where the voltages induced therein are in phase and effective to prepare said gated diode means for triggering into a highly conductive state when a trigger pulse is fed to the associated control terminal means, synchronizing circuit means for generating trigger pulses for the control terminal means of said gated diode means at a frequency higher than the free running frequency of the oscillator circuit to prevent saturation of said transformer core, whereby conduction of said gated diode means reverses the conductive states of said current control devices resulting in a reversal in polarity of the induced voltage in said feedback windings which renders the conducting gated diode means non-conductive again, said synchronizing circuit means including shock excitable resonant circuit means resonant at a frequency higher than the free running frequency of the oscillator, means for shock exciting said resonant circuit means including winding means on said transformer, and circuit means coupled between the control terminal means of said gated diode means and said resonant circuit for alternately triggering said gated diode means during successive half cycles of the signals generated in said resonant circuit.

5. The oscillator of claim 1 wherein said gated diode means include a pair of gated diodes whose load terminal means are connected in reverse parallel relation so that a different gated diode is prepared for triggering after each reversal of polarity of the voltage in said feedback windings, and said triggering pulses being effective to trigger the prepared gated diode each half cycle of the oscillator output.

6. An alternating current oscillator comprising: a first and a second unidirectional current control device each having load terminals and a control terminal, a source of energizing direct current, a pair of output terminals, inverter circuit forming means including means connecting said load terminals of said current control devices between said source of direct current and said output terminals to provide current flow in one direction through said output terminals when one of said devices is conductive and in the opposite direction through the output terminals when the other device is conductive, said inverter circuit means including a saturable core transformer having a first, second and third feedback winding and a primary winding, means connecting said primary winding to the load terminals of said current control devices wherein the direction of current flow through the primary winding varies with the particular current control device which is conducting, means connecting said first and second feedback windings in opposite sense respectively to the control terminals of said respective current control devices for providing a normally free running feedback oscillator where the control voltages induced into said feedback windings maintain conduction of the first to conduct current control device and prevent conduction of the other current control device until the transformer core reaches a given state of saturation or the device otherwise is rendered non-conductive where the conductive states of the devices will reverse, gated diode means having control terminal means and load terminal means, means connecting said third feedback winding and the load terminal means of said gated diode means in series between the control terminals of said current control devices, said feedback windings being connected in a loop circuit including the load terminal means of the gated diode means where the voltages induced therein are in phase and, during a portion of each cycle of oscillator operation, are effective to prepare said gated diode means for triggering when a trigger pulse is fed to the associated control terminal means, and oscillator synchronizing means for periodically feeding trigger pulses to the control terminal means of said gated diode means to trigger the gated diode means prepared for a triggering operation which reverses the conductive states of said current control devices resulting in the reversal in polarity of the induced voltage in said feedback windings which renders the conductive gated diode means non-conductive again, the frequency of said trigger pulses being sufficiently high that said given state of saturation of the transformer core is not normally reached before the gated diode means involved is fired.

7. The oscillator of claim 6 where there is provided means for sustaining conduction of the conducting gated diode means to ensure termination of the current trigger pulse before the triggered gated diode means is rendered nonconductive by the reversal of polarity of the voltages induced in said feedback windings, and said last mentioned means includes a capacitor in parallel with said third feedback winding.

8. An alternating current oscillator comprising: a first and a second unidirectional current control device each having load terminals and a control terminal, a source of energizing direct current, a pair of output terminals, inverter circuit forming means including means connecting said load terminals of said current control device between said source of direct current and said output terminals to provide current flow in one direction through said output terminals when one of said devices is conductive and in the opposite directon through the output termnals when the other device is conductive, said inverter circuit means including a saturable core transformer having a first, second and third feedback winding and a primary winding, means connecting said primary winding to the load terminals of said current control devices wherein the direction of current flow through the primary winding varies with the particular current control device which is conducting, means connecting said first and second feedback windings in opposite sense respectively to the control terminals of said respective current control devices for providing a normally free running feedback oscillator where the control voltages induced into said feedback windings maintain conduction of the first to conduct current control device and prevent conduction of the other current control device until the transformer core reaches a given state of saturation or the device otherwise is rendered non-conductive where the conductive states of the devices will reverse, a pair of gated diodes having control terminals and load terminals connected in opposed parallel relation, means connecting said third feedback winding and the parallel connected load terminals of said gated diodes in series between the control terminals of said current control devices, said feedback windings being connected in a loop circuit including the load terminals of the gated diodes where the voltages induced therein are in phase and effective to prepare one of said gated diodes at a time for triggering when a trigger pulse is fed to the associated control terminal, and means for feeding trigger pulses to the control terminals of said gated diodes to trigger the gated diode receiving a voltage of proper polarity from the feedback windings in said loop circuit, which reverses the conductive states of said current control devices resulting in a reversal in polarity of the induced voltage in said feedback windings which renders the gated diode non-conductive again.

9. The oscillator of claim 6 wherein there is provided a saturable choke in series with the load terminal means of said gated diode means and a shunting resistor in parallel with the load terminal means of said gated diode means and in series with said saturable choke, the resistor permitting current flow through said choke upon reversal of voltage in said transformer windings and before current flow in the fired gated diode means can be stopped by such reversal, saturation of the choke taking place after a short delay and the choke preventing reverse current flow through the gated diode means during the interval necessery to stop current flow therein.

10. A synchronized square wave oscillator circuit comprising: a source of direct current, a pair of output terminals, a first and second unidirectional current control device each having load terminals and a control terminal, inverter circuit forming means including means connecting said load terminals of said current control devices between said source of direct current and said output terminals to provide current flow in one direction through said output terminals when one of said devices is conductive and in the opposite direction through the output terminals when the other device is conductive, said inverter circuit forming means including a saturable core transformer having a first and second feedback winding and a primary winding, means connecting said primary winding to the load terminals of said current control devices wherein the direction of current flow through the primary winding varies with the particular current control device which is conducting, means connectnig said first and second feedback windings respectively to the control terminals of said first and second current control devices to form a free running square wave multivibrator, a synchronizing circuit for said multivibrator which synchronizes said multivibrator at a higher frequency than the free running frequency thereof, the synchronizing circuit comprising a pulse generator, means providing energizing voltage for said pulse generator comprising circuit means coupled to one of the windings on said transformer, the voltage induced in the transformer winding energizing said pulse generator circuit only when the transformer core is unsaturated, and means coupling the output of said pulse generator to the multivibrator circuit to operate the same in synchronism with the output thereof.

11. A square wave signal generator circuit comprising: a pair of current control devices each having a pair of load terminals and a control terminal, a source of direct current energizing voltage, a transformer having primary winding means coupled to the load terminals of said current control devices and said source of direct current energizing voltage wherein the direction of current flow through the primary winding means varies with the particular current control device which is conducting, secondary winding means forming feedback winding means coupled in the opposite sense to said control terminals for forming a multivibrator circuit wherein said current control devices are rendered alternately conductive and the voltage fed to the control terminals of one of said devices maintains conduction thereof while the voltage fed to the control terminals of the other device inhibits conduction thereof, starting means for initially feeding a starting current in a given direction through said primary winding means to start said multivibrator circuit, and disabling means for permanently termnating the feeding of current by said starting means through said primary winding means when the multivibrator has started operating until the multivibrator circuit has ceased operation, said starting means including a gated diode having load terminals in series with the primary winding means on said transformer and said source of direct current energizing voltage and a control terminal for firing the gated diode also connected to said source of energizing voltage to effect the firing of the gated diode.

12. The signal generator circuit of claim 11 wherein said means for terminating the feeding of current by said starting means comprises rectifier means and a capacitor coupled to windings on said transformer and to the load terminals of the gated diode to build up and maintain a back-biasing voltage across said capacitor when the oscillator starts oscillating, and means coupling said voltage across said capacitor to the control terminal of said gated diode to prevent firing of the gated diode once the multivibrator circuit starts operating.

References Cited by the Examiner
UNITED STATES PATENTS

| | | | |
|---|---|---|---|
| 2,271,166 | 2/61 | Schultz | 331—113 |
| 3,026,484 | 3/62 | Bennett et al. | 331—113 |
| 3,026,486 | 3/62 | Pintell | 331—113 |
| 3,085,211 | 4/63 | Jensen et al. | 331—113 |

ROY LAKE, *Primary Examiner.*

JOHN KOMINSKI, *Examiner.*